Jan. 19, 1965  N. MARTELLI  3,165,783
MACHINE FOR THE CORRUGATION OF CONTINUOUS
THERMOPLASTIC SHEET MATERIAL
Filed Dec. 21, 1962  2 Sheets-Sheet 1

INVENTOR
NERIO MARTELLI

Jan. 19, 1965   N. MARTELLI   3,165,783
MACHINE FOR THE CORRUGATION OF CONTINUOUS
THERMOPLASTIC SHEET MATERIAL
Filed Dec. 21, 1962   2 Sheets-Sheet 2

Inventor
NERIO MARTELLI
By *Imirie & Smiley*
Attorneys

United States Patent Office

3,165,783
Patented Jan. 19, 1965

3,165,783
MACHINE FOR THE CORRUGATION OF CONTINUOUS THERMOPLASTIC SHEET MATERIAL
Nerio Martelli, Bologna, Italy, assignor to Solvay & Cie., societe en commandite simple, Ixelles-Brussels, Belgium, and Compagnia Italiana Nest-Pack S.p.A., Bologna, Italy
Filed Dec. 21, 1962, Ser. No. 246,419
Claims priority, application Italy, Dec. 28, 1961, 23,569/61
3 Claims. (Cl. 18—19)

This invention relates to a rotary machine for the corrugation of continuous thermoplastic sheet material or the like.

According to the invention, the thermoplastic sheet material in the form of a continuous band, is passed between a revolving cage drum, peripherally provided with parallel spaced bars, and an endless chain grid comprising a pair of endless chains connected by spaced transverse bars which at least partially mesh between the drum bars along a considerable arc of the drum circumference.

The sheets to be corrugated, prior to their entering between the intermeshing cage drum and the endless chain grid are heated up to a plastic condition, or at least till they reach a condition at which they can be easily corrugated and remain between the intermeshing drum and chain grid until, at the end of the intermeshing arc, they are cooled to a temperature at which they are sufficiently hard to retain their shape when the chain grid comes apart from the said cage drum.

According to another feature of the invention, the sheet to be corrugated is fed to the cage drum at a speed which is slightly higher than the peripheral speed of the drum itself, so as to avoid that the sheet material be stretched upon corrugation. Moreover between the feed device and the point at which the rolled sheet is engaged between the cage drum and the chain grid, there is preferably created a certain reserve of material, for example in the form of an ample loop or apron in the piece or band of rolled sheet fed to the drum, always with the purpose of avoiding stretchings during the corrugation.

The bars of the cage drum and/or the bars of the chain grid may have any suitable cross-section shape and are preferably readily dismountable and changeable with other bars having different shapes and/or sizes. Furthermore the bars of the chain grid and/or the bars of the cage drum may be adjusted radially to the drum, in order to vary the depth of corrugation and/or the wave height.

The above and other features of the invention and the advantages deriving therefrom will appear from the following specification of a preferred embodiment, shown by way of non-limiting example on the accompanying drawings, in which.

Figure 1:
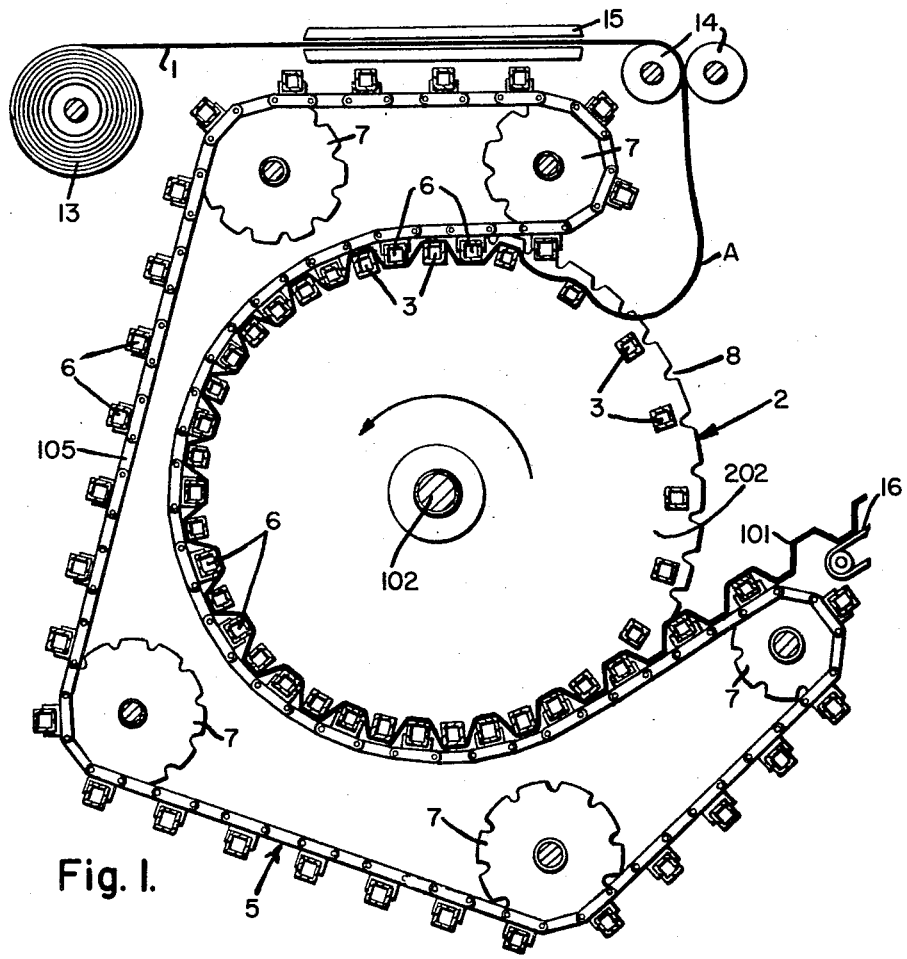
FIGURE 1 is a diagrammatic view of the corrugating device of a machine according to the invention, in side elevation and with parts in section.
Figure 2:
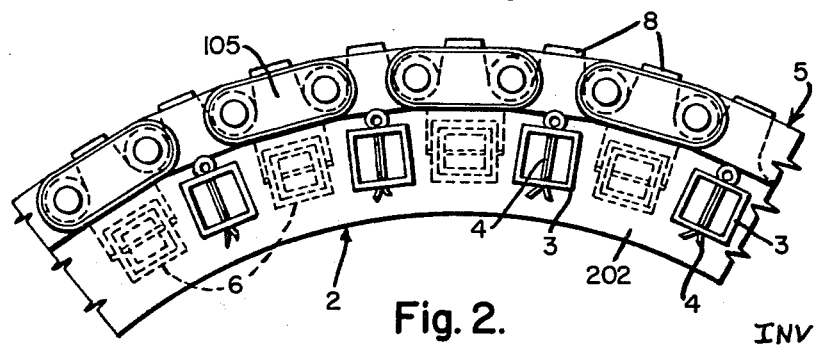
FIGURE 2 shows, in side elevation, a fraction of the peripheral part of the cage drum, in an enlarged scale.
Figure 3:
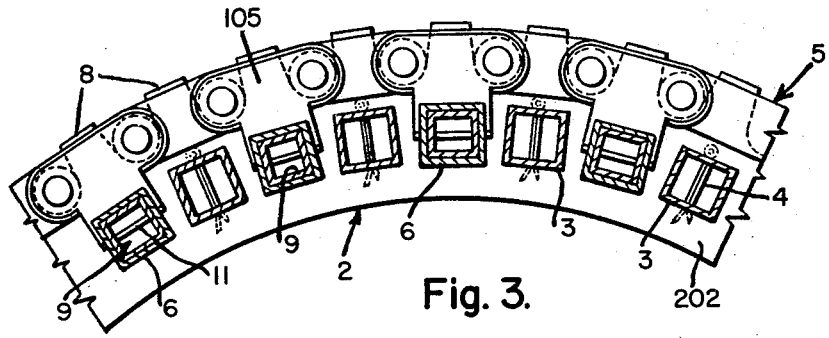
FIGURE 3 is a vertical section of the same fraction of the cage drum.
Figure 4:
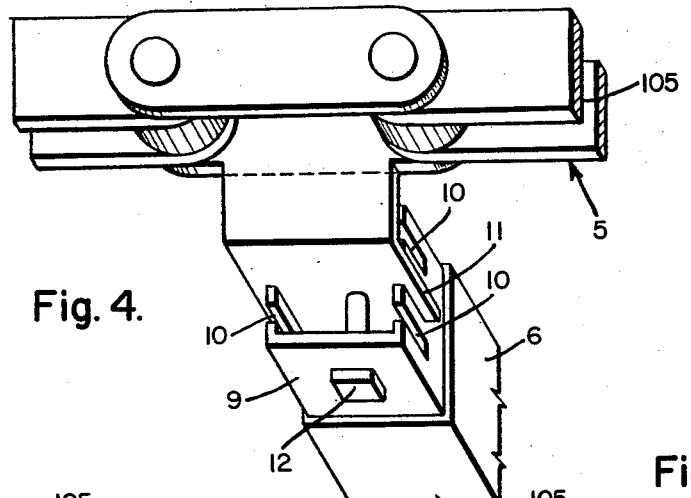
FIGURE 4 shows in perspective view, from beneath, one end of a part of the chain grid, in correspondence of one of the bars.
Figures 5, 6:
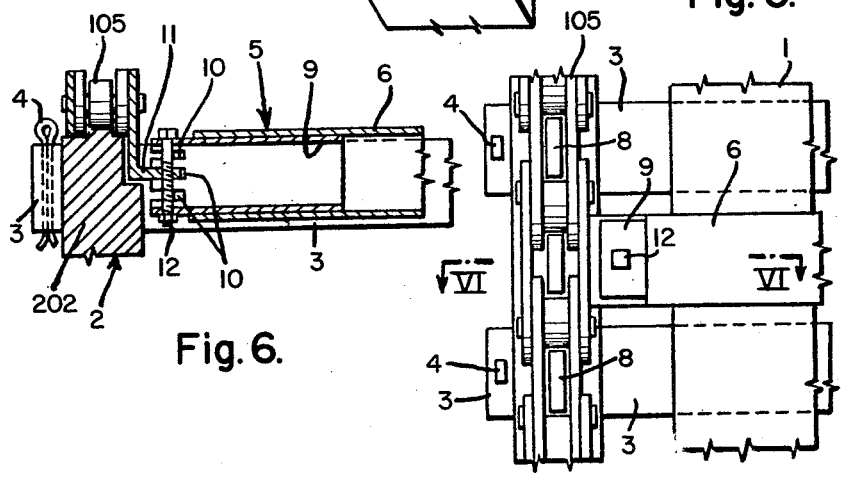
FIGURE 5 shows in plan view a part of the chain grid meshing with the cage drum.
FIGURE 6 is a section on line VI—VI of FIGURE 5.

In the drawing there is shown a rotary machine for the corrugation of continuous bands 1 of thermoplastic material. The machine comprises a rotatable drum 2, journaled with its axis substantially horizontal and constructed as a cage, that is peripherally provided with bars 3, which are parallel to its axis and are uniformly spaced. In the embodiment as shown, said cage drum 2 is made of a pair of sprocket wheel-like head portions 202, provided with sprocket teeth 8 and mounted on shaft 102, and between which there are secured bars 3. The bars 3 are passed through corresponding holes provided in the head portions 202 and are secured to these latters by easily dismountable means, for example by means of split pins 4. For a certain fraction of the drum periphery including its top part, its descending side part and the lower part, the cage drum 2 preferably co-operates with an endless link chain grid 5, comprising a pair of parallel endless link chains 105 connected together by uniformly spaced transverse bars 6 which mesh or engage between the bars 3 of the cage drum 2, while the endless link chains 105 mesh with the sprocket teeth 8 of the drum heads 2 and with the sprocket teeth of intermediate sprocket wheels 7 which lead the part of the chain away from the drum periphery. This sprocket-like engagement ensures a synchronous movement of the cage drum 2 and the chain grid 5.

The bars 6 of the chain grid are also easily interchangeable and adjustable radially with respect to the drum 2. To this purpose, in the embodiment as shown the said bars 6 are tubular and their ends are fitted with slight forcing, onto corresponding fitting members or adaptors 9, which on their turn are connected to chain links 105 which, for this purpose, are provided with spaced L members 11, while each adaptor 9 is provided on its free end with one or more parallel notches 10, into one of which the horizontal wing or flange of the corresponding L shaped members 11 is inserted and fastened to said adaptor 9 for example by means of a bolt 12. By fastening the horizontal flange of members 11 into one or the other of the notches 10, the position of bars 6 may be varied with respect to the drum axis and perpendicularly to the chain grid planes between the bars 3 on drum 2 and consequently the depth of the bars 6 in the space between the bars 3 of the cage drum 2 may be adjusted. In the embodiment as shown, both the bars 6 of chain grid and the bars 3 of the cage drum 3 are tubular, and have a square section. Of course the section of said bars may be whatsoever, as for example round or triangular or other type, and may be also different for the bars 3 of drum 2 and bars 6 of belt 5.

The continuous band 1 of thermoplastic material is uncoiled from the spool 13, for example by means of feed rollers 14, and passes through a heating device 15, where it is heated to a plastic condition, and is fed by a pair of feed cylinders 14 to the point in which the cage drum 2 and the chain grid 5 come into mesh and thus said band is drawn around drum 2 by grid 5 and is corrugated by the intermeshing bars 3, 6 and at the same time is drawn forward.

The speed at which the band 1 to be corrugated is uncoiled from spool 13 and fed by the rollers 14 between drum 2 and chain grid 5 is higher than the peripheral speed of drum 2, in order to compensate for the shrinkage consequent to the corrugation of the band and to avoid stretching due to corrugation. Moreover the softened band which comes out from the roller pair 14, before coming between the chain grid 5 and drum 2 forms an ample loop A, which builds up a reserve of material which serves to compensate for the possible irregularities in the feed of the band downstream and/or upstream with respect to it, and thus it avoids stretchings during the corrugation.

The corrugated band 101 leaves the cage drum 2 at its lower section and it is discharged from the chain grid 5, for example onto a conveyor belt 16. It is to be noted that the deformation and the corrugation of the band 1 takes place immediately at the inlet side between the cage drum 2 and the chain grid 5, in the upper section of said drum, while the remaining part of the wide arc of the cage drum 2, which it is in mesh with the chain grid 5, the band 1 is kept steadily engaged between the interposed bars 3, 6, which cause its corrugation, until it cools off so as to leave the drum 2 without undergoing further steady deformations. Said cooling of the corrugated band 101 while it is still entrained between the interposed bars 3, 6, may be speeded up, for example by employing fans, blower nozzles or also either by circulating inside said tubular bars 3, 6 a suitable coolant or by dipping the lower section of the cage drum 2 into a suitable cooling bath. By the forced cooling, the rotation speed of the cage drum 2, and consequently also the output of the machine, may be suitably increased.

The bath, through which drum 2 is dipped instead than for cooling, may be used for any treatment, for example a surface treatment, of the corrugated band.

From the above it appears evident that one of the main advantages of the invention consists in the remarkable production rate of corrugated plastic bands by continuous rotary cycle, obtained by employing very simple and economical mechanical means consisting of a sprocket wheel-like drum and a chain grid meshing therewith for a wide arc, so as to give ample time to the thermoplastic band being corrugated for its cooling until its hardness becomes sufficient to avoid deformation of the corrugated band, when it comes out of the intermeshing drum and chain grid.

I claim:

1. A machine for corrugating continuous sheets of thermoplastic material, comprising a rotatable cage drum formed by a pair of sprocket wheel-like head pieces interconnected at their periphery by longitudinal spaced tubular bars open at their ends for passage of a coolant, means for supporting said cage drum for rotation about a horizontal axis, an endless chain grid including a pair of parallel endless chains each formed by a plurality of hinged links adapted to mesh with said sprocket wheel-like head pieces of said cage drum, and transverse tubular bars open at their ends for passage of a coolant each connected at each end to one link of a pair of facing links of said parallel endless chains, said drum bars and the said chain grid bars being so spaced as to permit the said chain grid bars to intermesh with the said drum bars, driving means for driving in synchronism said drum and said chain grid, chain guide means for guiding said chain grid causing it to follow the periphery of said cage drum over a wide extent along which the drum bars intermesh with the grid bars, an inlet between the intermeshing drum bars and chain grid bars, means for feeding a continuous sheet of thermoplastic material towards said inlet, and heating means ahead of said inlet for heating said sheet to a plastic condition.

2. A machine for corrugating continuous sheets of thermoplastic material, comprising a rotatable cage drum formed by a pair of sprocket wheel-like head pieces interconnected at their periphery by longitudinal spaced tubular bars open at their ends for passage of a coolant, means for supporting said cage drum for rotation about a horizontal axis, an endless chain grid including a pair of parallel endless chains each formed by a plurality of hinged links adapted to mesh with said sprocket wheel-like head pieces of said cage drum, transverse open ended bars for passage of a coolant each connected at each end to one link of a pair of facing links of said parallel endless chains, and means on said links cooperating with said transverse bar ends for dismountably and adjustably securing said transverse bars to said chains so as to permit adjusting of said bars in a transversal plane substantially at right angles to the plane of said chain grid, said drum bars and the said chain grid bars being so spaced as to permit the said chain grid bars to intermesh with the said drum bars, driving means for driving in synchronism the said drum and the said chain grid, chain guide means for guiding said chain grid causing it to follow the periphery of said cage drum over a wide extent along which the drum bars intermesh with the grid bars, an inlet between the intermeshing drum bars and chain grid bars, means for feeding a continuous sheet of thermoplastic material towards said inlet and heating means ahead of said inlet for heating said sheet to a plastic condition.

3. A machine according to claim 2 wherein said means for dismountably and adjustably securing the transverse bars to the chains comprises a tubular sleeve telescoped in each end of each bar, a plurality of spaced slots in the end of each sleeve, a plurality of L-shaped elements each having one leg pivoted to a chain link and the other leg inserted in one of the slots of said sleeve, and a removable fastener passing through apertures in said sleeve and said other leg.

References Cited by the Examiner
UNITED STATES PATENTS 2,508,489   5/50   Browne et al.
2,695,652   11/54  Segil _____ 18—19

FOREIGN PATENTS 1,220,899   3/60   France.

WILLIAM J. STEPHENSON, *Primary Examiner.*